Figure 1:
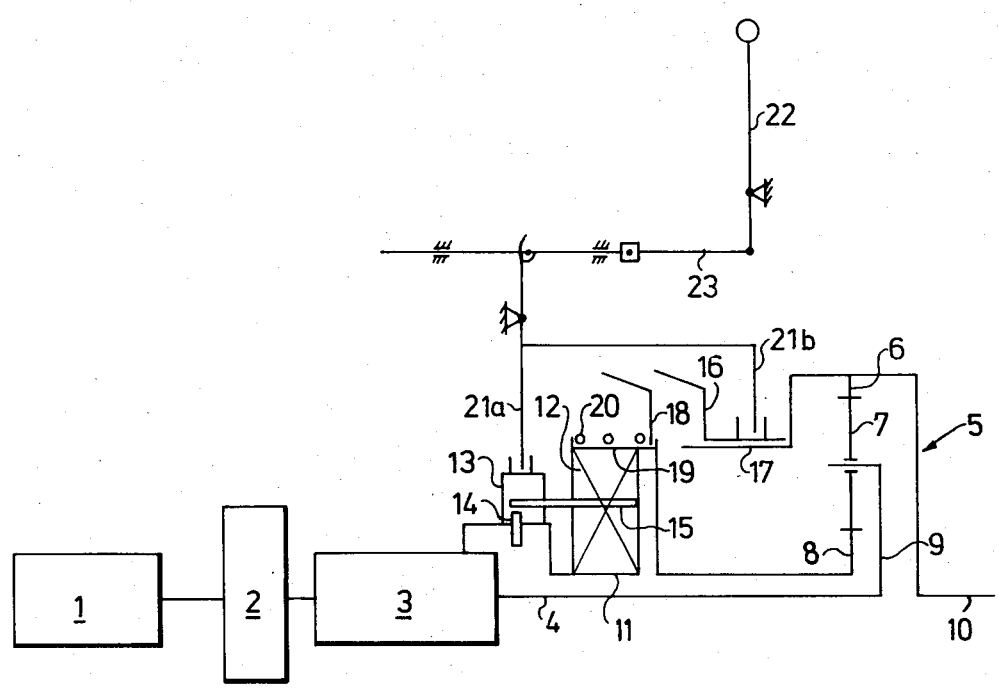

United States Patent [19]

Weiertz et al.

[11] 4,223,572
[45] Sep. 23, 1980

[54] OVERDRIVE FOR MOTOR VEHICLES

[75] Inventors: Stig H. A. Weiertz, Kungälv; Grzegorz K. Janiszewski, Göteborg, both of Sweden

[73] Assignee: AB Volvo, Göteborg, Sweden

[21] Appl. No.: 837,212

[22] Filed: Sep. 27, 1977

[30] Foreign Application Priority Data

Oct. 6, 1976 [SE] Sweden ................... 7611073

[51] Int. Cl.³ .................. F16H 57/10; F16D 67/02
[52] U.S. Cl. ................... 74/781 R; 74/740; 192/12 B; 192/18 R
[58] Field of Search ............ 74/781 R, 740, 784; 192/18 R, 12 B

[56] References Cited

U.S. PATENT DOCUMENTS

| | | | |
|---|---|---|---|
| 2,518,837 | 8/1950 | Taylor | 74/781 R |
| 2,651,394 | 9/1953 | Sinclair | 74/781 R |
| 2,654,269 | 10/1953 | Wilson | 74/781 R X |
| 2,806,387 | 9/1957 | Forster et al. | 74/781 R X |
| 2,933,944 | 4/1960 | Carnagua | 74/781 R X |
| 2,946,240 | 7/1960 | Kop | 74/781 R X |
| 3,182,528 | 5/1965 | Lamburn | 74/781 R X |
| 3,618,425 | 11/1971 | Wickman | 74/781 R |
| 3,631,741 | 1/1972 | Kelbel | 74/781 R |
| 3,682,020 | 8/1972 | Scheiter | 74/781 R X |

FOREIGN PATENT DOCUMENTS 542771 1/1970 Sweden .

Primary Examiner—Samuel Scott
Assistant Examiner—Randall L. Green
Attorney, Agent, or Firm—Young & Thompson

[57] ABSTRACT

An overdrive for motor vehicles is disclosed which comprises a planetary carrier joined to an input shaft, a ring gear with internal teeth, said ring gear engaging planet pinions carried on the planet carrier and being joined to an output shaft, and a sun pinion engaging the planet pinions. A one-way clutch is disposed between the housing of the overdrive and the sun pinion and is arranged to lock the sun pinion to the housing when driving torque is transmitted from the input shaft to the output shaft. A second clutch is disposed to lock the sun pinion to the ring gear when engaged, the one-way clutch having a control which cooperates with an operator for the second clutch to suspend the blocking function of the one-way clutch before the second clutch is engaged.

5 Claims, 6 Drawing Figures

OVERDRIVE FOR MOTOR VEHICLES

The present invention relates to an overdrive for motor vehicles comprising a planetary carrier which is joined to an input shaft, a ring gear with internal teeth, which ring gear engages planet pinions carried on the planet carrier and is joined to an output shaft, and a sun pinion engaging the planet pinions.

Previously known overdrive units of the above-mentioned type are operated with complicated electromagnetic or electrohydraulic systems. They are therefore heavy and expensive, and are often sensitive to disturbances in operation. In addition, the hydraulic systems reduce the power as a result of pump losses. Fuel consumption cannot be reduced to the desired degree due to the fact that the overdrive acts even when driving in the opposite direction, i.e. from the wheels. It produces engine braking, which is unnecessary in view of the fact that the air resistance at the velocities at which the overdrive is used are relatively great.

The present invention is intended to achieve an overdrive of the type described, which eliminates the above disadvantages and also has additional advantages over known designs.

This is achieved according to the invention by disposing a onw-way clutch between the housing of the overdrive and the sun pinion, said one-way clutch being arranged to lock the sun pinion to the housing when driving torque is transmitted from the input shaft to the output shaft, and by disposing a second clutch to lock the sun pinion to the ring gear when engaged, the one-way clutch being provided with control means which cooperate with operating means for the second clutch, to suspend the blocking function of the one-way clutch before the second clutch is engaged.

This overdrive can be engaged and disengaged mechanically with the aid of the gearshift lever of the main gear box or a simple electrohydraulic system. It has no marked neutral position in the transition from and to the overdrive position and can therefore, because of the short distance to be moved, be easily adapted to the shift pattern of the main gear box, and be placed in the same line as third and fourth gear, for example in a four speed gear box. This makes operation simpler than in a conventional five speed gear box. The second clutch provides smoother shifting, especially when down shifting, while the one-way clutch eliminates engine braking when the overdrive is engaged, thus reducing fuel consumption. Due to the fact that the one-way clutch has no effect on the other gears, engine braking is still obtained in these gears, where there is actually a need for it, at the same time as the one-way clutch only need be designed for relatively small loads.

Figure 2:
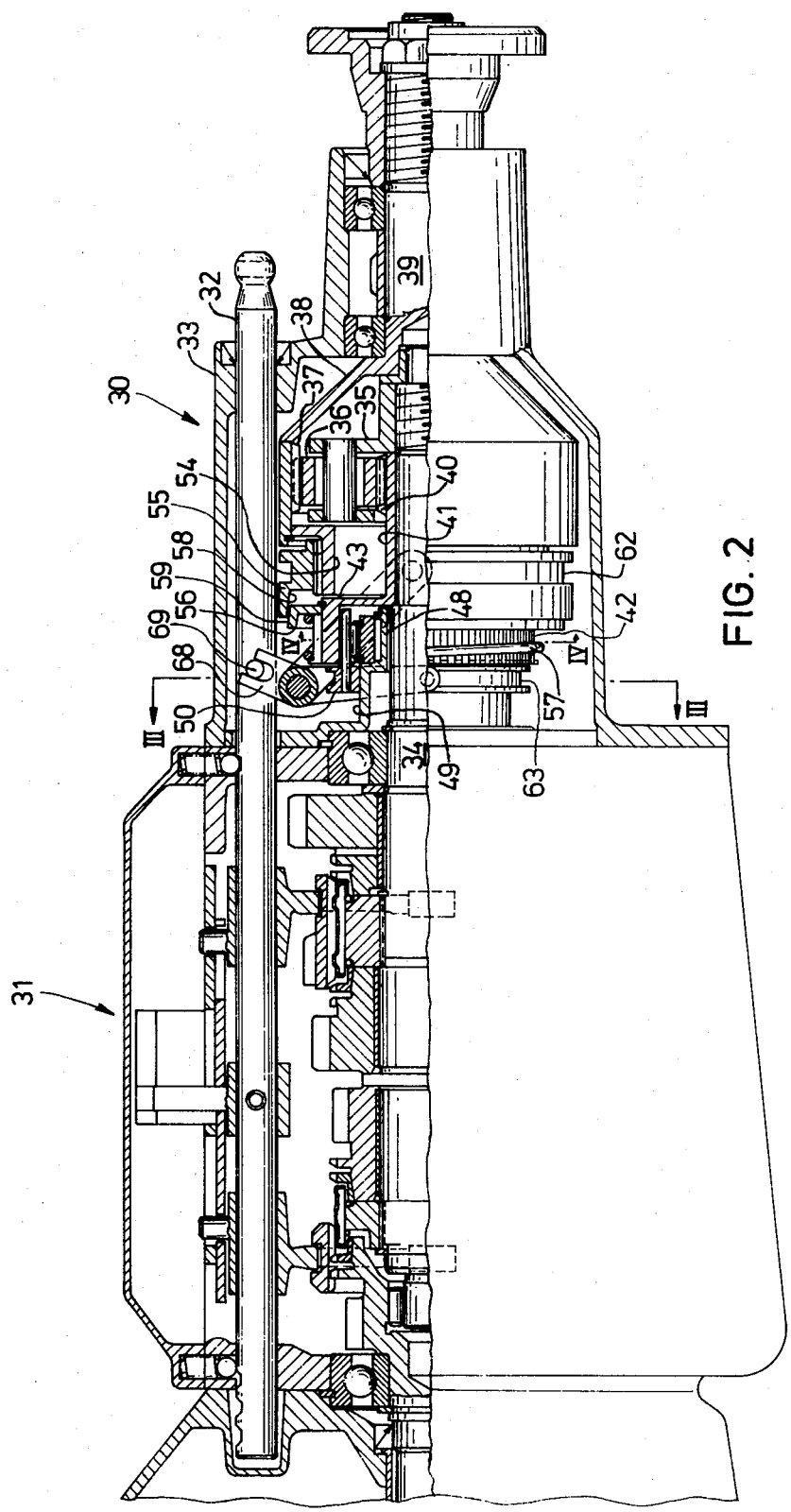
Figure 3:
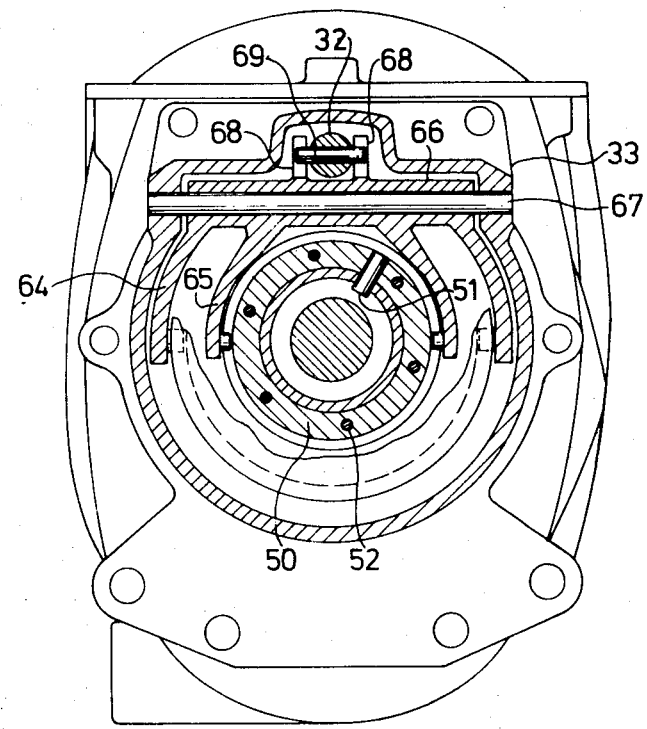
Figure 5:
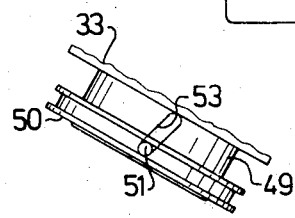
Figure 6:
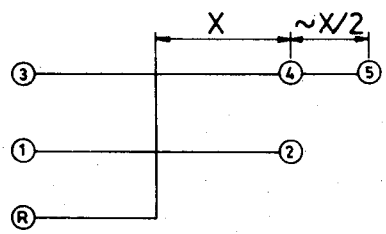
Figure 4:
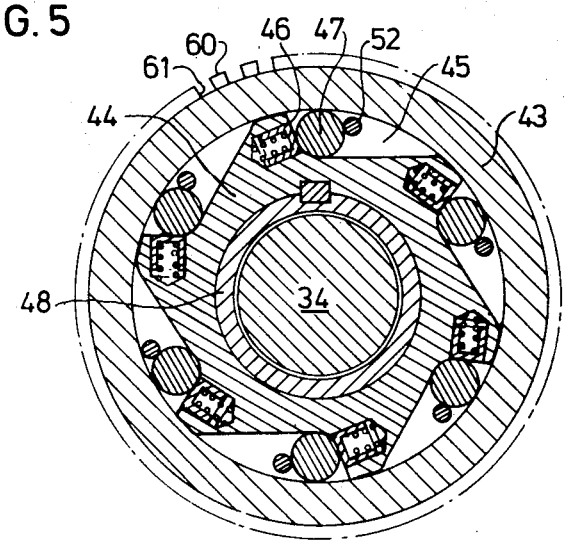

These and other advantages of the invention will be described below with reference to the accompanying drawings showing examples, in which FIG. 1 shows schematically an overdrive according to the invention, FIG. 2 shows an embodiment partially in longitudinal section of the overdrive according to the invention coupled to a four speed gear box, FIG. 3 shows a section along the line III—III in FIG. 2, FIG. 4 shows a section along the line IV—IV in FIG. 2 with the one-way clutch disengaged, FIG. 5 is a view of the control means for the one-way clutch in FIG. 2, and FIG. 6 shows the shift pattern for the gear box with the overdrive in FIG. 2.

In FIG. 1 an engine is designated 1; 2 is a main clutch and 3 is a gear box. To the output shaft 4 of the gear box 3, there is connected an overdrive consisting of a planetary gear assembly 5, which has a ring gear 6, planet pinions 7 and a sun pinion 8. The planet carrier 9 of the planetary gear 5 is joined to the output shaft 4 of the gear box 3, while the ring gear 6 is joined to the output shaft 10 of the planetary gear assembly. A one-way clutch 12 is coupled in between the sun pinion 8 and the housing 11 of the planetary gear assembly 5, which one-way clutch can be made, by sliding and simultaneous turning of a sleeve 13, to disengage the sun pinion 8 for rotation in both directions. For this purpose the sleeve 13 has a radial pin 14 which turns the sleeve when it is displaced axially, and a number of axial pins 15 which displace the locking members of the one-way clutch out of the engagement position, as will be described below in more detail with reference to FIGS. 2–5.

Between the ring gear 6 and the sun pinion 8, a clutch is arranged comprising a first clutch member 16, provided with a friction layer and which is axially displacable on a hub 17 joined to the ring gear 6, and a second clutch member 18, which is carried on a hub 19 joined to the sun pinion and to the one-way clutch 12. The second clutch member 18 is limitedly displacable axially and is biased towards the first clutch member 17 by a spring 20. The displacement of the clutch member 16 and the sleeve 13 is achieved with the aid of forks 21a, 21b, which are coupled to the shift lever 22 of the gear box 3 via a shifting rod 23.

FIG. 1 shows the clutch, consisting of clutch members 16 and 18, in the disengaged position. The sleeve 13 is in a position in which the one-way or free-wheel clutch 12 is in operation, i.e. it permits rotation of the hub 19 and the connected sun pinion 8 in only one rotational direction. In driving from the output shaft 4 of the gear box 3, the torque is transmitted to the planet carrier 9, and the sun pinion 8 is blocked against rotation in the rotational direction of the planet carrier by the one-way clutch 12. Thus the planet pinions 7 roll off against the stationary sun pinion 8 and drive the disengaged ring gear at a higher r.p.m. than the r.p.m. of the planet carrier 9. Thus the overdrive is engaged, producing an approximate gear ratio between the output shaft 4 of the gear box 3 and the output shaft 10 of the planetary gear assembly 5 of 0.7:1, for example.

In transmitting torque in the opposite direction, that is from the driving wheels of the vehicle via the output shaft 10 of the planetary gear assembly to the ring gear 6, the one-way clutch 12 allows the sun pinion 8 to rotate freely oppositely to the direction of rotation of the ring gear. Thus engine braking is eliminated when the overdrive is engaged, resulting in reduced fuel consumption.

Shifting from overdrive to fourth gear for example is done by first disengaging the main clutch 2, and then moving the shift lever 22 of the gear box 3 into the fourth gear position. This first disengages the one-way clutch 12 completely by the fork 21a displacing the sleeve 13, so that the one-way clutch 12 permits free rotation in both directions of the hub 19 and the sun pinion 8 joined thereto.

Clutch member 16 is moved towards clutch member 18 by the fork 21b, and the friction surfaces of the clutch members serve as synchronizing means to synchronize the rotational speeds of the ring gear 6 and the sun pinion 8. With the clutch members 16,18 in engagement with one another, the planetary gear assembly is locked and its output shaft 10 rotates at the same r.p.m. as the output shaft 4 of the gear box.

FIG. 2 shows an embodiment of an overdrive 30 according to the invention connected to a four speed gear box 31 of the type described in Swedish Patent Application 7607458-2. This gear box is especially suited for use together with an overdrive according to the invention due to the fact that it uses a single shift rod for shifting between all of the gears. This shift rod can, as illustrated in FIG. 2, be replaced by an extended shift rod 32, which also extends through the housing of the overdrive and can be used for engaging and disengaging the overdrive.

The overdrive 30 in FIG. 2 has the same design and function in principle as that described above. The gear box 31 drives via its output shaft 34 a planet carrier 35 with planet pinions 36. A ring gear 37 is joined via a member 38 to the output shaft 39 of the overdrive. The sun pinion 40 is rotatably journalled on the shaft 34. The sun pinion is made on a sleeve 41 with a section 43, which forms the outer ring of a one-way or free-wheel clutch, generally designated 42.

The one-way clutch 42 has, as is most clearly shown in FIG. 4, an inner clutch member 44 with cavities 45 which hold spring 46 biased locking members in the form of rollers 47. Clutch member 44 is rigidly joined to a sleeve 48, which is in turn joined to the overdrive housing 33. A disengaging sleeve 50 is rotatably and slidably journalled on a section 49 of the sleeve 48 with greater diameter. This disengaging sleeve carries a radially directed pin 51 (see FIGS. 3 and 5) and several axially directed pins 52. The radial pin extends into a diagonal groove 53 in section 49 of the sleeve 48, while the axial pins 52 extend into the cavities 45 in the clutch member 44. The interaction of the radial pin 51 and the groove 53 produces a turning of the disengaging sleeve 50 when it is displaced axially, whereby the locking members 47 can be moved out of locking engagement with the ring 43 by the axial pins 52.

The ring gear 37 is joined to a hub section 54, on which a first clutch member 55 is slidably mounted. A second clutch member 56 is limitedly slidably mounted on the outer ring 43 of the one-way clutch and is biased towards the first clutch member by a spring 57. The clutch members 55,56 have friction surfaces 58,59 which serve as synchronizing means. The inner circumferences of the clutch members 55,56 have alternating axial teeth and cavities 60,61 (see FIG. 4), which engage corresponding teeth and cavities in the hub section 54 and outer ring 43 respectively. To lock the sun pinion to the ring gear, clutch member 55 is pushed to the left as seen in FIG. 2, so that the friction surfaces 58,59 first contact one another for synchronization of rotational speeds. Clutch member 56 is then pushed to the left against the pressure of the spring 57 so that the teeth 60 of clutch member 55 will engage the cavities in the outer ring 43.

To achieve displacement of the first clutch member 55 and the disengaging sleeve 50, they each have a peripheral groove 62 and 63 respectively, into which a shift fork, 64 or 65 respectively, engages (see FIG. 3). Forks 64,65 are rigidly joined to a common sleeve 66 which is journalled on a shaft 67 in the housing 33 and which has on either side of the shift rod 32 U-shaped sections 68 extending upwards, in which the outer ends of a pin 69 engage which is rigidly joined to the shift rod. The clutch member 55, the sleeve 50 and the forks 64,65 are so fitted to one another that the axial pins 52 in the sleeve are caused to block the locking members 47 of the one-way clutch 42 before the friction surfaces 58,59 of the clutch members 55,56 begin synchronization.

As can be seen from FIG. 2 the right-hand shank of the U-shaped sections 68 is shorter than that on the left. Through this design the pin 69 can, after disengagement of the overdrive, be brought out of engagement with the U-shaped sections 68. Thereafter, the shift rod 32 is completely free to perform the shifting in the main gear box 31. The overdrive according to the invention can therefore be engaged and disengaged with the shift lever of the main gear box according to the shift pattern shown in FIG. 6, in which overdrive is indicated as a fifth gear directly in line with third and fourth gear. This shifting pattern with only two lateral positions for the forward gears is entirely superior to the usual five-speed gear box pattern with three lateral positions.

Furthermore with an arrangement according to the invention, in which a marked neutral position is lacking, the engagement movement of the shift lever from fourth gear to overdrive can be quite short, e.g. about half of the distance between fourth and neutral, as illustrated in FIG. 6.

What we claim is:

1. In an overdrive for motor vehicles, comprising a housing, a planetary carrier which is joined to an input shaft, a ring gear with internal teeth, which ring gear engages planet pinions carried on the planet carrier and is joined to an output shaft, a sun pinion engaging the planet pinions, and a main gear box coupled to the overdrive, said main gear box providing four forward gears and neutral, in addition to said overdrive; the improvement comprising a one-way clutch (12,42) that is coupled in-between the housing (11,33) of the overdrive and the sun pinion (8, 40), said one-way clutch being arranged to lock the sun pinion to the housing when driving torque is transmitted from the input shaft to the output shaft, a second clutch (16,18; 55,56) which establishes, when engaged, a non-turnable connection between the sun pinion and the ring gear, the one-way clutch having control means (13,50) which cooperate with operating means (21b,64) for the second clutch to suspend the blocking function of the one-way clutch before the second clutch is engaged, said control means being connected to a shift rod which is common to said gears in said main gear box, said shift rod being movable from third gear through neutral to fourth gear and being movable farther in the same direction from fourth gear to overdrive without passing through neutral.

2. In an overdrive for motor vehicles, comprising a housing, a planetary carrier which is joined to an input shaft, a ring gear with internal teeth, which ring gear engages planet pinions carried on the planet carrier and is joined to an output shaft, a sun pinion engaging the planet pinions, and a main gear box coupled to the overdrive, said main gear box providing four forward gears and neutral, in addition to said overdrive; the improvement comprising a one-way clutch (12,42) that is coupled in-between the housing (11,33) of the overdrive and the sun pinion (8, 40), said one-way clutch being arranged to lock the sun pinion to the housing when driving torque is transmitted from the input shaft to the output shaft, a second clutch (16,18; 55,56) which establishes, when engaged, a non-turnable connection between the sun pinion and the ring gear, the one-way clutch having control means (13,50) which cooperate with operating means (21b,64) for the second clutch to suspend the blocking function of the one-way clutch before the second clutch is engaged, the one-way clutch (42) having an interior clutch member (44) with cavities (45) distributed around its periphery, which hold spring biased locking members (47) which are disposed to block an outer clutch member (43), concentric with the inner clutch member against rotation in one direction, the control means of the one-way clutch comprising a rotatably journalled sleeve (50) with a plurality of axial pins (52) which extend into individual cavities (45) in the inner clutch member (44) and are disposed when the sleeve (50) is turned to a disengaging position, to block the locking members (47) and prevent them from locking the outer clutch member (43) so that it is freely rotatable in both directions relative to the inner coupling member.

3. Overdrive according to claim 2, characterized in that the sleeve (50) is rotatably and slidably mounted on a hub (49) rigidly joined to the overdrive housing, said sleeve having a radially directed pin (51), which engages in a recess (53) in the hub, which recess is oblique to the axial direction, so that axial displacement of the sleeve produces simultaneous turning of the same.

4. Overdrive according to claim 3, characterized in that the second clutch has a first clutch and synchronizing member (55) axially displacably mounted on a hub (54) rigidly joined to the ring gear and a second clutch and synchronizing member (56) mounted so as to be limitedly axially displacable on the outer clutch member (43) of the one-way clutch and spring biased towards the first clutch and synchronizing member, the first clutch and synchronizing member (55) and the sleeve (50) being displacable by individual shift forks (64,65) swingably journalled in the overdrive housing and engaging a shift rod (32) which is an extension of a shift rod in the main gear box, and being so disposed that the sleeve with its axial pins (52) blocks the lock members (47) of the one-way clutch before the first and second clutch and synchronizing members engage one another.

5. Overdrive according to claim 4, characterized in that the shift forks (64,65) are rigidly joined to one another and have a common section (68) for engagement with carrier means (69) on the shift rod (32), said section and carrier means being so constructed that the shift rod, after displacement of the first and second clutch and sychronization of members (55,56) into engagement with one another, can be displaced further so that said section (68) and the carrier means (69) are brought out of engagement with one another.

* * * * *